(12) United States Patent
Bao et al.

(10) Patent No.: US 12,371,381 B2
(45) Date of Patent: Jul. 29, 2025

(54) HIGH-STRENGTH PRESTRESSED COMPOSITE CERAMIC AND PREPARATION METHOD THEREOF

(71) Applicants: China Building Material Test & Certification Group Co., Ltd., Beijing (CN); China Building Materials Academy Co., Ltd., Beijing (CN)

(72) Inventors: Yiwang Bao, Beijing (CN); Fenghua Kuang, Beijing (CN); Hongbo Zhang, Beijing (CN); Detian Wan, Beijing (CN)

(73) Assignees: China Building Material Test & Certification Group Co., Ltd., Beijing (CN); China Building Materials Academy Co., Ltd., Beijing (CN)

( * ) Notice: Subject to any disclaimer, the term of this patent is extended or adjusted under 35 U.S.C. 154(b) by 1377 days.

(21) Appl. No.: 17/000,311

(22) Filed: Aug. 22, 2020

(65) Prior Publication Data

US 2021/0130239 A1    May 6, 2021

Related U.S. Application Data

(63) Continuation of application No. PCT/CN2019/076052, filed on Feb. 25, 2019.

(30) Foreign Application Priority Data

Feb. 26, 2018  (CN) .......................... 201810159609.1
Sep. 5, 2018   (CN) .......................... 201811030015.7

(51) Int. Cl.
C04B 35/10   (2006.01)
C04B 35/64   (2006.01)
(Continued)

(52) U.S. Cl.
CPC .............. *C04B 35/10* (2013.01); *C04B 35/64* (2013.01); *C04B 41/0081* (2013.01);
(Continued)

(58) Field of Classification Search
None
See application file for complete search history.

(56) References Cited

U.S. PATENT DOCUMENTS 3,024,303 A * 3/1962 Smothers ............... H01B 17/02
                                           174/209
3,729,575 A * 4/1973 Harding .................. H01B 1/00
                                           313/313

OTHER PUBLICATIONS

Structural Design and Performance of Al2O3/ZrO2 Laminated Ceramics; Chen et al Dec. 11, 2000; National Natural Science Major Fund Project; (Year: 2000).*

* cited by examiner

*Primary Examiner* — Humera N. Sheikh
*Assistant Examiner* — Elizabeth D Ivey (57) ABSTRACT

The present invention discloses a high-strength prestressed composite ceramic and a preparation method thereof, and belongs to a ceramic reinforcing technology in the field of high-performance structural ceramics. Firstly, more than two kinds of bondable ceramics need to be determined to form a composite ceramic of a matrix material and a surface layer material, the matrix material should have sufficient strength and a higher expansion coefficient, and the surface layer material should have a lower expansion coefficient and a higher elastic modulus, realizing the balance of the surface layer compressive stress and the matrix tensile stress are formed after high-temperature co-sintering; and the surface layer compressive stress can greatly improve the bending strength of the composite ceramic. The magnitude of the compressive stress can be adjusted by optimizing the section (Continued)

ratio of the two materials of the cross sections, the surface prestress is designed to be more than the strength value of the surface layer material for the given two materials, and the section ratio is determined through deduction and calculation of a prestress calculation formula. The composite ceramic with prestress can be obtained after sintering greatly improving the strength. The present invention solves the current problem of difficulty in improving the strength of structural ceramics and has good practical value.

10 Claims, 4 Drawing Sheets

(51) Int. Cl.
    *C04B 41/00*      (2006.01)
    *C04B 41/45*      (2006.01)
    *C04B 41/50*      (2006.01)
    *C04B 41/87*      (2006.01)

(52) U.S. Cl.
    CPC ........ *C04B 41/009* (2013.01); *C04B 41/4578* (2013.01); *C04B 41/5032* (2013.01); *C04B 41/87* (2013.01); *C04B 2235/3217* (2013.01)

HIGH-STRENGTH PRESTRESSED COMPOSITE CERAMIC AND PREPARATION METHOD THEREOF

TECHNICAL FIELD

The present invention relates to a ceramic reinforcing technology in the field of high-performance structural ceramics, in particular to a high-strength prestressed composite ceramic and a preparation method thereof.

BACKGROUND ART

Ceramic materials are widely used in aviation, aerospace, ships, weapons, electronics, nuclear industry and other fields due to their high insulation properties, excellent corrosion resistance and high mechanical strength.

However, existing ceramic materials and products have two problems: firstly, it is difficult to obtain ultra-high strength by adopting conventional process means, and it is difficult to meet performance indexes or economic indexes under a specific service environment; secondly, in the preparation process, especially in the processing process, defects which are difficult to avoid in ceramic materials and ceramic products can be introduced, which would become weak points in the subsequent use process, leading to product failures, and causing catastrophic accidents. This is also a factor in the growing decline of structural ceramics.

There are two main categories of literature and patents relating to prestressed ceramics: one type is that metal and ceramic are compounded as described in patents CN 102155323A, CN 102672145A and the like to generate prestress; another type is to apply prestressing directly to the ceramic surface by prestressing means, as described in CN 101564826A. The two methods may produce uneven distribution of prestress interface and more defects.

SUMMARY OF THE INVENTION

In order to solve the problems in the prior art, the present invention provides a high-strength prestressed composite ceramic and a preparation method thereof. According to the present invention, the mechanical model of the composite ceramic is established, the prestress is designed on the surface of the material, realizing the purpose of greatly improving the strength of two or more materials after compounding by controlling key parameters such as material components, sectional areas and the like. The high-strength prestressed composite ceramic prepared by the present invention has the advantages of high strength and few defects, and is simple in production process and capable of meeting batch production requirements.

In order to solve the technical problem, the present invention provides the technical scheme as follows:

The invention provides a high-strength prestressed composite ceramic, which consists of a matrix material and a surface layer material; the expansion coefficient of the Surface layer Material is lower than that of the matrix material; the elastic modulus of the surface layer material is not lower than that of the matrix material; and the surface layer material is uniformly coated on the matrix material;

The shape of the matrix material can be regular or special-shaped; it may be merely a material or a component.

Furthermore, the sectional area ratio of the matrix material to the surface layer material is obtained through the following calculation formula:

$$\frac{A_s}{A_c} = \sigma_{pre} \Big/ \left[ \left(1 - \frac{\alpha_c}{\alpha_s}\right) \cdot E_s \cdot \alpha_s \cdot \Delta T_c - \sigma_{pre} \cdot \frac{E_s}{E_c} \right]$$

Wherein, $A_S$ and the $A_C$ are the cross sectional areas of the matrix material and the surface layer material respectively; $\sigma_{pre}$ is the prestress; $\alpha_s$ and $\alpha_c$ are thermal expansion coefficients of the matrix material and the surface layer material respectively; $E_S$ and $E_C$ are the elastic moduli of the matrix and the surface layer materials respectively; $\Delta T_C$ is the equivalent temperature difference of high-strength prestressed composite ceramic from sintering temperature to room temperature.

In the case where the above conditions are satisfied, the surface layer material and the matrix material may respectively be one selected from alumina, zirconia, silicon carbide, silicon nitride and the like.

Further, the sectional area ratio of the matrix material and the surface layer material is 1.0-2500; whether the sectional area is circular, rectangular or a special-shaped structure, it can be calculated, according to the top view and the sectional view thereof based on a conventional mathematical formula or by using professional drawing/calculation software; so long as the cross-sectional view is given, the sectional area ratio can be directly calculated.

Further, the surface layer material is a single-component monolayer or a multi-component multilayer.

The present invention also provides a preparation method of the high-strength prestressed composite ceramic, which comprises the following steps:

(1) preparing a matrix material and a surface layer material;

(2) preparing a composite ceramic green body: uniformly coating the surface layer material on the surface of the matrix material in a particle accumulation mode; and (3) high-temperature co-sintering: sintering the composite ceramic green body at a high temperature to finish high-temperature co-sintering of the surface layer material and the Matrix material, and then synchronously cooling down to form the high-strength prestressed composite ceramic.

Further, in the step (2), the surface layer material is completely coated or partially, coated on the matrix material; and the partial coating is a symmetric coating. In the step (2), the surface of the matrix material is coated with the surface layer material in a particle accumulation mode, and the specific mode can be realized by adopting most existing ceramic forming processes and sintering processes.

The present invention also provides a high-strength prestressed composite ceramic, which comprises a multilayer structure formed by a matrix and a surface layer; the expansion coefficient of a surface layer material constituting the surface layer is lower than that of a matrix material constituting the matrix; the elastic modulus of the surface layer material is not lower than that of the matrix material; and the surface layer is coated on the matrix.

Further, the sectional area ratio of the matrix to the surface layer is 0.1-2500.

Further, the surface layer is a single-component monolayer or a multi-component multilayer.

Further, the surface layer material and the matrix material are different and independently selected from alumina, cordierite, mullite, and magnesia-alumina spinel.

Further, the surface layer material is cordierite and the matrix material is alumina.

Further, the surface layer material is completely or partially coated on the matrix material.

Further, the partial coating is a symmetric coating.

Furthermore, the prestressed ceramic is formed by co-sintering the matrix material and the surface layer material at a high temperature.

Furthermore, the sectional area ratio of the matrix material to the surface layer material is obtained through the following calculation formula:

$$\frac{A_s}{A_c} = \sigma_{pre} / \left[ \left(1 - \frac{\alpha_c}{\alpha_s}\right) \cdot E_s \cdot \alpha_s \cdot \Delta T_c - \sigma_{pre} \cdot \frac{E_s}{E_c} \right]$$

Wherein, $A_S$ and the $A_C$ are the cross sectional areas of the matrix material and the surface layer material respectively; $\sigma_{pre}$ is the prestress; $\alpha_s$ and $\alpha_c$ are thermal expansion coefficients of the matrix material and the surface layer material respectively; $E_S$ and $E_C$ are the elastic moduli of the matrix and the surface layer materials respectively; $\Delta T_C$ is the equivalent temperature difference of high-strength prestressed composite ceramic from sintering temperature to room temperature.

Further, the surface layer material is a single-component monolayer or a multi-component multilayer.

The present invention also provides a preparation method of the high-strength prestressed composite ceramic described above, which comprises the following steps:
(1) preparing a matrix material and a surface layer material;
(2) preparing a composite ceramic green body: uniformly coating the surface layer material on the surface of the matrix material in a particle accumulation mode; and
(3) high-temperature co-sintering: sintering the composite ceramic green body at a high temperature to finish the high-temperature co-sintering of the surface layer material and the matrix material, and then synchronously cooling down to form the high-strength prestressed composite ceramic.

Further, in the step (1), the matrix material is prepared by making the matrix material into a predetermined shape to form the matrix.

Further, in the step (2), the surface layer material is completely or partially coated on the matrix material.

Further, the partial coating is a symmetric coating.

And further, the composite ceramic green body is sintered at a high temperature of 800-1800° C. to finish the high-temperature co-sintering of the surface layer material and the matrix material, followed by synchronously cooling to room temperature to form the high-strength prestressed composite ceramic.

Further, the expansion coefficient of the surface layer material is lower than that of the matrix material, and the elastic modulus of the surface layer material is not lower than that of the matrix material.

Further, the surface layer material and the matrix material are different and independently selected from alumina, cordierite, mullite, and magnesia-alumina spinel.

Further, the cross-sectional area ratio of the matrix to the surface layer is 0.1-2500.

In the present invention, firstly, an internal stress value (i.e. prestressing force) artificially and subjectively is preset on the surface layer material, and key parameters such as material components, sectional areas and the like and the high-temperature co-sintering process are controlled through an established composite ceramic mechanical model, realizing the purpose of greatly improving the internal tensile stress and the bending strength of the surface compressive stress of two or more materials after compounding. In the present invention the internal stress is preset on the surface layer material, so that the bending strength of the composite ceramic can be improved by up to 238% relative to the bending strength of the surface layer material, and can be improved by up to 57.5% relative to the bending strength of the matrix material. According to the present invention, the surface prestress of the materials is designed for the ceramic components with different sizes, greatly improving the overall bending strength of the composite ceramic, and obtaining the ultra-high strength composite ceramic materials and products.

The invention has the following beneficial effects:
(1) the strength is high, the bending strength of the high-strength prestressed composite ceramic prepared by the present invention cart be greatly improved and is higher than the highest of the matrix material and the surface layer material, and the strength of the high-strength prestressed composite ceramic is different from the condition that the strength of a conventional composite material is between the strengths of the two materials; the bending strength can be improved by up to 238% relative to the surface layer material and by up to 57.5% relative to the matrix material;
(2) the size is small, the product size can be smaller than that of similar products under the condition of ensuring strength, saving resources;
(3) batch production can be realized, the preparation process is simple, most existing ceramic forming processes and sintering processes can be adopted for compounding the matrix layer and the surface layer, and the method is suitable for industrial mass production.

DETAILED DESCRIPTION OF THE INVENTION

In order that the technical problems, technical solutions, and advantages to be solved by the present invention will become more apparent, a detailed description will be given below with reference to specific embodiments thereof and the accompanying drawings.

The above solution will be further described below in conjunction with specific embodiments. It should be understood that these examples are intended to illustrate the present invention and are not intended to limit the scope of the present invention.

The conditions employed in the examples may be further adjusted depending on the particular product and are generally those found in routine experimentation.

The materials, reagents, etc. used in the following examples are commercially available.

The present invention also provides a high-strength prestressed composite ceramic, characterized by being formed by co-sintering a matrix material and a surface layer material at a high temperature; the expansion coefficient of the surface layer material is lower than that of the matrix material; the elastic modulus of the surface layer material is not lower than that of the matrix material; and the surface layer material is uniformly coated on the matrix material.

Furthermore, the sectional area ratio of the matrix material to the surface layer material is obtained through the following calculation formula:

$$\frac{A_s}{A_c} = \sigma_{pre} / \left[ \left(1 - \frac{\alpha_c}{\alpha_s}\right) \cdot E_s \cdot \alpha_s \cdot \Delta T_c - \sigma_{pre} \cdot \frac{E_s}{E_c} \right]$$

Wherein, $A_S$ and the $A_C$ are the cross sectional areas of the matrix material and the surface layer material respectively; $\sigma_{pre}$ is the prestress; $\alpha_s$ and $\alpha_s$ are thermal expansion coefficients of the matrix material and the surface layer material respectively; $E_S$ and $E_C$ are the elastic moduli of the matrix and the surface layer materials respectively; $\Delta T_C$ is the equivalent temperature difference of high-strength prestressed composite ceramic from sintering temperature to room temperature.

Further, the surface layer material is a single-component monolayer or a multi-component multilayer.

The present invention also provides a preparation method of the high-strength prestressed composite ceramic, which is characterized by comprising the following steps:
(1) preparing a matrix material and a surface layer material;
(2) preparing a composite ceramic green body: uniformly coating the surface layer material on the surface of the matrix material in a particle accumulation mode; and
(3) high-temperature co-sintering: sintering the composite ceramic green body at a high temperature to finish the high-temperature co-sintering of the surface layer material and the matrix material, and then synchronously cooling down to form the high-strength prestressed composite ceramic.

In the step (2), the surface layer material is completely coated or partially coated on the matrix material.

Further, the partial coating is a symmetric coating.

The present invention also provides a high-strength prestressed composite ceramic which comprises a multilayer structure formed by a matrix and a surface layer; wherein the expansion coefficient of the surface layer material forming the surface layer is lower than that of the matrix material forming the matrix, and the elastic modulus of the surface layer material is not lower than that of the matrix material; and the matrix is coated with the surface layer;

Further, the sectional area ratio of the matrix to the surface layer is from 0.1-2500, preferably 1-200, more preferably 3-150, most preferably 4-75, such as 6, 10, 15, 20, 25, and 30.

The surface layer may be a single-component monolayer or a multi-component multilayer.

The surface layer material and the matrix material are different and are independently selected from alumina, cordierite, mullite, and magnesia-alumina spinel. For example, the surface layer material/matrix material described above may be any of the following monolayer or multilayer transition options: cordierite/alumina, mullite/alumina, cordierite/magnesia-alumina spinet, and cordierite/mullite.

Further, the surface layer material is cordierite and the matrix material is alumina.

The surface layer material may completely coated or partially coated on the matrix material. Preferably, the partial coating is a symmetric coating.

According to the present invention, also provided is a preparation method of the high-strength prestressed composite ceramic, which comprises the following steps:
(1) making a matrix material into a predetermined shape to form a matrix;
(2) coating a surface layer material on the surface of the matrix layer in a particle accumulation mode to form a surface layer to prepare a prestressed ceramic green body; and
(3) sintering the pre-stressed ceramic green body at a high temperature of 800-1800° C. (preferably 1300-1700° C., more preferably 1350-1650° C.) and then cooling to room temperature (20° C.) to form the pre-stressed ceramic.

In the preparation method according to the present invention, the surface layer material is bondable with the matrix material. The expansion coefficient of the surface layer material is lower than that of the matrix material, and the elastic modulus of the surface layer material is not lower than that of the matrix material.

In the step 1, making the matrix material into the predetermined shape to form the matrix, which may be, for example, a regular shape such as a cylinder, a square column, or other special shape, may be carried out using conventional methods in the art. The matrix material may be merely a material or may be a component. The porosity of the matrix material is generally controlled below 90%, preferably 60-80%. According to one embodiment, in the step 2, when the prestressed ceramic green body is prepared, a prestress value is firstly set on the surface layer material, and then the sectional area ratio of the surface layer to the matrix is calculated through the following formula, whereby the thickness of the surface layer is calculated:

$$\frac{A_s}{A_c} = \sigma_{pre} / \left[ \left(1 - \frac{\alpha_c}{\alpha_s}\right) \cdot E_s \cdot \alpha_s \cdot \Delta T_c - \sigma_{pre} \cdot \frac{E_s}{E_c} \right]$$

wherein, $A_S$ and the $A_C$ are the cross sectional areas of the matrix and the surface layer respectively; $\sigma_{pre}$ is the prestress; $\alpha_s$ and $\alpha_c$ are thermal expansion coefficients of the matrix material and the surface layer material respectively; $E_S$ and $E_C$ are the elastic moduli of the matrix and the surface layer materials respectively; $\Delta T_C$ is the equivalent temperature difference of the prestressed ceramic from sintering temperature to room temperature (20° C.; and the surface layer material is then coated onto the matrix surface by conventional methods, such as spraying.

The setting of the prestress value needs to meet the following conditions:
 1. positive value, that is, forming a compressive stress on the surface layer;
 2. cannot exceed the proof pressure of the surface layer itself; and
 3. the tensile stress formed correspondingly cannot exceed the strength of the matrix.

After the prestress value meeting the above conditions is set, the corresponding sectional area ratio can be calculated according to the above formula, so that the coating thickness of the surface layer material can be determined. The prestress value is preferably in the range of 1000-1500 MPa, preferably 1100-1350 MPa.

Figure 1:
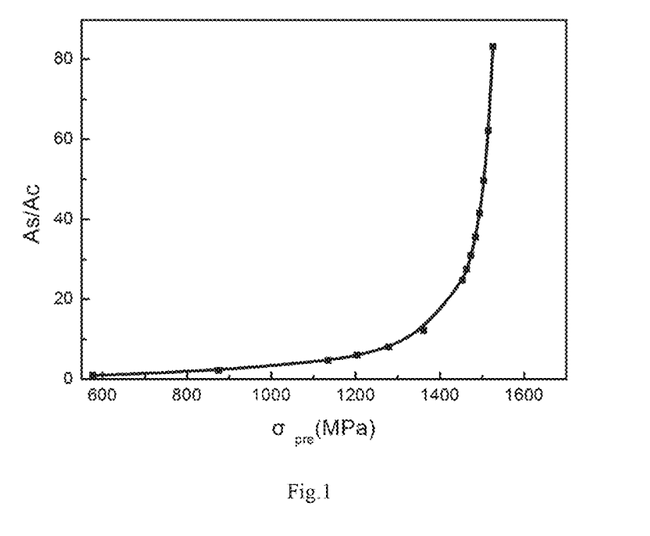
FIG. 1 is a typical curve of the prestress-sectional area ratio of the high-strength prestressed composite ceramic surface layer material of the present invention.
Figure 8:
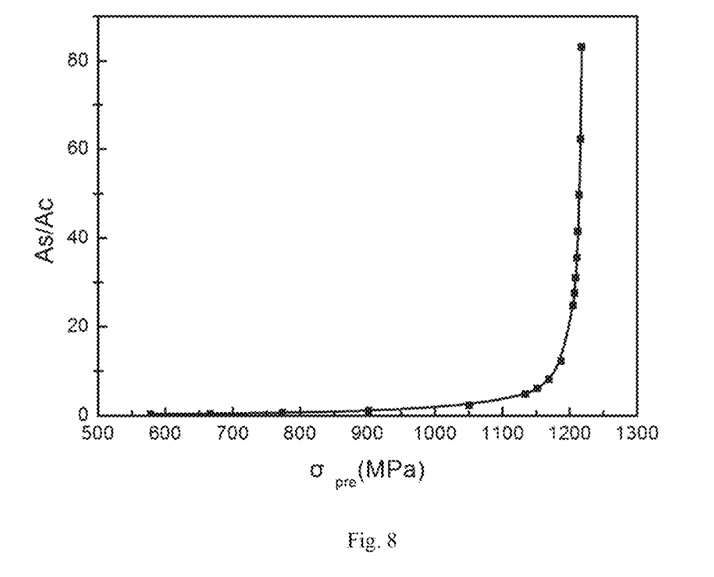
FIG. 8 is a typical curve of a prestress-sectional area ratio of the high-strength prestressed composite ceramic surface layer material of the present invention.

Specifically, FIG. 1 shows a typical curve of the prestress-sectional area ratio when the surface layer material is alumina and the matrix material is zirconia, and FIG. 8 shows a typical curve of the prestress-sectional area ratio when the surface layer material is cordierite and the matrix material is alumina.

The coating of the surface layer material may be carried out using techniques conventional in the art, such as spraying.

The materials, reagents, etc. used in the taming examples are commercially available.

Hereinafter, the present invention will be described in detail by specific examples.

EXAMPLE 1

Prepared was a high-strength prestressed composite ceramic having a surface layer material of alumina of which the elastic modulus is 390 GPa, and the expansion coefficient is $7.8 \times 10^{-6}$/° C., and a matrix material of zirconia of which the elastic modulus is 220 GPa, the expansion coefficient is $10.5 \times 10^{-6}$/° C.; wherein the matrix material is a cylinder with a diameter of 5 mm, and the section area ratio was calculated by a circular section.

Firstly, an internal stress value (i.e. a prestress value) was preset on the surface layer material, and corresponding sectional area ratio was calculated by the following formula, wherein the numerical corresponding relationship between the two is shown in table 1.

$$\frac{A_s}{A_c} = \sigma_{pre} / \left[\left(1 - \frac{\alpha_c}{\alpha_s}\right) \cdot E_s \cdot \alpha_s \cdot \Delta T_c - \sigma_{pre} \cdot \frac{E_s}{E_c}\right]$$

Wherein, $A_S$ and the $A_C$ are the cross sectional areas of the matrix material and the surface layer material respectively; $\sigma_{pre}$ is the prestress; $\alpha_s$ and $\alpha_c$ are thermal expansion coefficients of the matrix material and the surface layer material respectively; $E_S$ and $E_C$ are the elastic moduli of the matrix and the surface layer materials respectively; $\Delta T_C$ is the equivalent temperature difference of high-strength prestressed composite ceramic from sintering temperature to room temperature.

Figure 2:
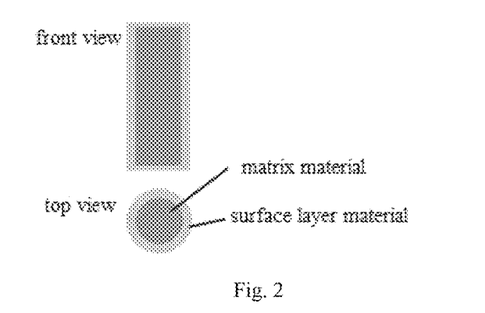
FIG. 2 is a complete-coated circular sectional structure model according to Example 1 of the present invention.

A preparation method of the high-strength prestressed composite ceramic comprises the following steps:
 (1) preparation of matrix and surface layer materials; wherein the surface layer material is alumina, of which the elastic modulus is 390 GPa, and the expansion coefficient is $7.8 \times 10^{-6}$/° C., and the matrix material is zirconia, of which the elastic modulus is 220 GPa, the expansion coefficient is 10.5×10-6/° C.; wherein the matrix material is a cylinder with a diameter of 5 mm.
 (2) manufacture of a composite ceramic green body: firstly, setting a prestress value, and then calculating the sectional area ratio (a prestress-sectional area ratio curve is shown in FIG. 1) of the surface layer material to the matrix material through the sectional area ratio calculation formula to calculate the thickness of the surface layer material; then uniformly and completely coating the surface of the zirconia cylinder by spraying the alumina material (the coating schematic diagram is shown in FIG. 2, wherein the sectional area ratio of the alumina material to the zirconia cylinder is calculated from the top view); and the parameters are shown in Table 1, Example 1; and
 (3) high-temperature co-sintering: sintering the composite ceramic green body at a high temperature of 1500° C. for 3 h to finish the high-temperature co-sintering of the surface layer material and the matrix material, and then synchronously cooling down to room temperature to form the high-strength prestressed composite ceramic.

TABLE 1

| Sequence Number | High Temperature Co-Sintering Temperature/° C. | $\Delta T_C$/° C. | $\sigma_{pre}$/MPa | $A_S/A_C$ |
|---|---|---|---|---|
| EXAMPLE 1 | 1500 | 1480 | 1135.66 | 4.76 |
| EXAMPLE 2 | 1500 | 1480 | 1203.45 | 6.01 |
| EXAMPLE 3 | 1500 | 1480 | 1278.34 | 8.09 |
| EXAMPLE 4 | 1500 | 1480 | 1361.49 | 12.25 |
| EXAMPLE 5 | 1500 | 1480 | 1454.29 | 24.75 |
| EXAMPLE 6 | 1500 | 1480 | 1504.82 | 49.75 |
| EXAMPLE 7 | 1500 | 1480 | 1515.29 | 62.25 |
| EXAMPLE 8 | 1350 | 1330 | 1306.89 | 24.75 |
| EXAMPLE 9 | 1650 | 1630 | 1601.68 | 24.75 |

The prestress and sectional area ratio curve of the high-strength prestressed composite ceramic prepared in the example is shown in FIG. 1, and it can be seen from FIG. 1 that within a certain range, the prestress value increases along with the increase of the ratio of the sectional area of the matrix material to the sectional area of the surface layer material, and does not increase any more when the ratio exceeds a certain range. The bending strength of the high-strength prestressed composite ceramic prepared by the three-point bending test method is 1112.875 MPa, wherein the bending strength of the matrix material is 880 MPa, and the bending strength of the surface layer material is 410 MPa. The bending strength of the high-strength prestressed composite ceramic prepared by the method is improved by 171.4% than that of the surface layer material, and by up to 26.5% relative to that of the matrix material.

EXAMPLE 2

Figure 3:
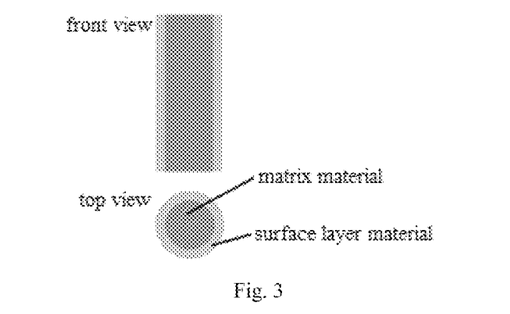
FIG. 3 is a partial-coated circular sectional structure model according to Example 2 of the present invention.

In this example, the parameters were set according to Example 2 in Table 1, in which the alumina material was partially symmetrically coated on the surface of the zirconia cylinder by a spray coating method (the coating schematic is shown in FIG. 3, in which the sectional area ratio of the two was calculated from the top view), and the remaining conditions were the same as in Example 1.

The bending strength of the high-strength prestressed composite ceramic prepared by the three-point bending test method is 1161.684 MPa, and the bending strength of the high-strength prestressed composite ceramic prepared in the example is improved by 183.3% than that of the surface layer material, and by 32.0% relative to that of the matrix material.

EXAMPLE 3

Figure 4:
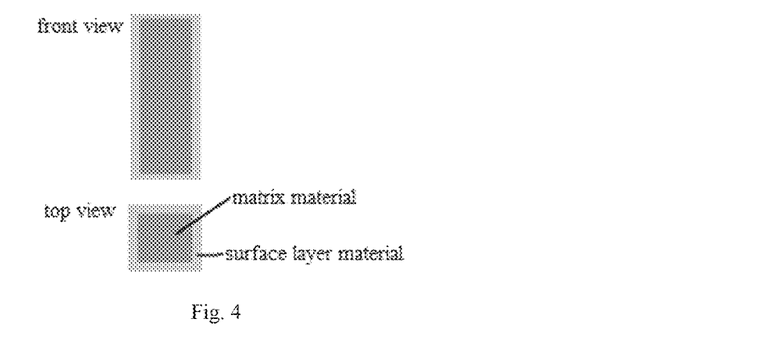
FIG. 4 is a complete-coated rectangular sectional structure model according to Example 3 of the present invention.

In this example, the parameters were set according to Example 3 of Table 1, in which the matrix material of this example is a cubic cylinder having a same length and width of 5 mm, and the alumina material was uniformly and completely coated on the surface of the zirconia cylinder by a spray coating method (the coating schematic diagram is shown in FIG. 4, in which the sectional area ratio of the two was calculated from the top view), and the remaining conditions were the same as in Example 1.

The bending strength of the high-strength prestressed composite ceramic prepared by the three-point bending test method is 1215.605 MPa, and the bending strength of the high-strength prestressed composite ceramic prepared in the example is improved by 196.5% than that of the surface layer material, and by 38.1% relative to that of the matrix material.

EXAMPLE 4

Figure 5:
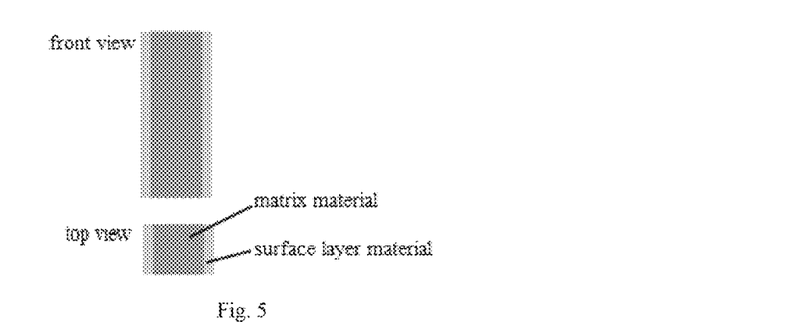
FIG. 5 is a partial-coated rectangular sectional structure model according to Example 4 of the present invention.

In this example, the parameters were set according to Example 4 in Table 1, in which the matrix material of this example is a cubic cylinder having the same length and width of 5 mm, and the alumina material was partially symmetrically coated on the surface of the zirconia cylinder by a spray coating method (the coating schematic is shown in FIG. 5, in which the sectional area ratio of the two was calculated from the top view), and the remaining conditions were the same as in Example 1.

The bending strength of the high-strength prestressed composite ceramic prepared by the three-point bending test method is 1275.473 MPa, and the bending strength of the high-strength prestressed composite ceramic prepared in the example is improved by 211.1% than that of the surface layer material, and by 44.9% relative to that of the matrix material.

EXAMPLE 5

Figure 6:
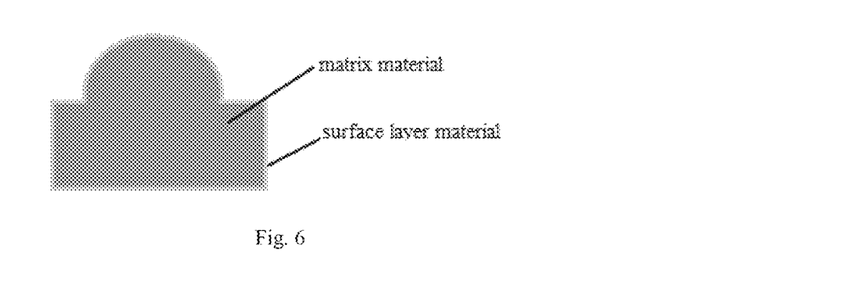
FIG. 6 is a complete-coated special-shaped sectional structure model according to Example 5 of the present invention.

In this example, the parameters were set according to Example 5 in Table 1, in which the matrix material of this example is of a special-shaped structure, and the alumina material was uniformly and completely coated on the surface of the zirconia cylinder by a spraying method (the coating schematic diagram is shown in FIG. 6, and the cross-sectional area ratio of the two was calculated based on the sectional view in the drawings), and the remaining conditions were the same as in Example 1.

The bending strength of the high-strength prestressed composite ceramic prepared by the three-point bending test method is 1342.289 MPa, and the bending strength of the high-strength prestressed composite ceramic prepared in the example is improved by 227.4% than that of the surface layer material, and by 52.5% relative to that of the matrix material.

EXAMPLE 6

Figure 7:
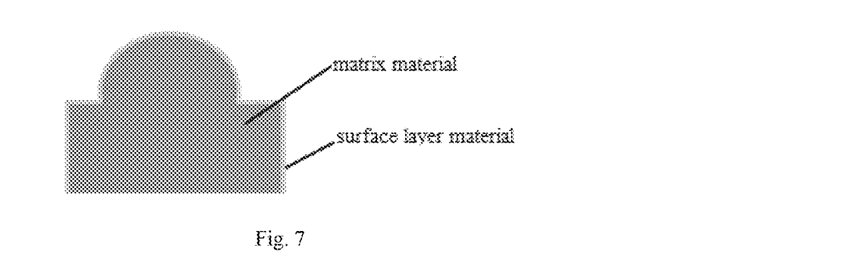
FIG. 7 is a partial-coated special-shaped sectional structure model according to Example 6 of the present invention.

In this example, the parameters were set according to Example 6 in Table 1, in which the matrix material of this example is of a special-shaped structure, and the alumina material was symmetrically coated on the surface of the zirconia cylinder by a spraying method (the coating schematic diagram is shown in FIG. 7, and the cross-sectional area ratio of the two was calculated based on the sectional view in the drawings), and the remaining conditions were the same as in Example 1.

The bending strength of the high-strength prestressed composite ceramic prepared by the three-point bending test method 1378.67 MPa, and the bending strength of the high-strength prestressed composite ceramic prepared in the example is improved by 236.3% than that of the surface layer material, and by 56.7% relative to that of the matrix material.

EXAMPLE 7

In this example, the parameters were set according to Example 7 in Table 1, and the remaining conditions were the same as Example 1.

The bending strength of the high-strength prestressed composite ceramic prepared by the three-point bending test method 1386.209 MPa, and the bending strength of the high-strength prestressed composite ceramic prepared in the example is improved by 238.1% than that of the surface layer material, and by 57.5% relative to that of the matrix material.

EXAMPLE 8

In this example, the parameters were set according to Example 8 in Table 1, and the remaining conditions were the same as Example 2.

The bending strength of the high-strength prestressed composite ceramic prepared by the three-point bending test method 1308.16 MPa, and the bending strength of the high-strength prestressed composite ceramic prepared in the example is improved by 219.1% than that of the surface layer material, and by 48.7% relative to that of the matrix material.

EXAMPLE 9

In this example, the parameters were set according to Example 9 in Table 1, and lore remaining conditions were the same as Example 2.

The bending strength of the high-strength prestressed composite ceramic prepared by the three-point bending test method is 1383.61 MPa, and the bending strength of the high-strength prestressed composite ceramic prepared in the example is improved by 237.5% than that of the surface layer material, and by 57.2% relative to that of the matrix material.

In addition to the alumina/zirconia system described above, the surface layer material/matrix material could be any of the following options: silicon carbide/zirconium oxide, silicon carbide/alumina, silicon nitride/silicon carbide, silicon nitride/alumina, silicon nitride/zirconium oxide and the like, and the bending strength of the prepared high-strength prestressed composite ceramic could be greatly improved. Due to limited space, all of them wouldn't detailed herein.

EXAMPLE 10

According to the embodiment, provided is a prestressed ceramic having a surface layer material of cordierite, of which the elastic modulus is 145 GPa, and the expansion coefficient is $2.1 \times 10^{-6}/°$ C.; and a matrix material of alumina, of which the elastic modulus is 390 GPa and the expansion coefficient is $7.8 \times 10^{-6}/°$ C. The matrix is a cylinder with a diameter of 5 mm and a length of 50 mm, and the sectional area ratio is calculated by a circular section.

Firstly, an internal stress value (i.e. a prestress value) was preset to 1134.63 MPa on the surface layer material, and corresponding sectional area ratio was calculated by the following formula, wherein the numerical corresponding relationship between the two is shown in table 1:

$$\frac{A_s}{A_c} = \sigma_{pre} / \left[ \left(1 - \frac{\alpha_c}{\alpha_s}\right) \cdot E_s \cdot \alpha_s \cdot \Delta T_c - \sigma_{pre} \cdot \frac{E_s}{E_c} \right]$$

wherein, $A_S$ and the $A_C$ are the cross sectional areas of the matrix and the surface layer respectively; $\sigma_{pre}$ is the prestress; $\alpha_S$ and $\alpha_c$ are thermal expansion coefficients of the matrix material and the surface layer material respectively; $E_S$ and $E_C$ are the elastic moduli of the matrix and the surface layer materials respectively; $\Delta T_C$ is the equivalent temperature difference of the prestressed ceramic from sintering temperature to room temperature (20° C.).

Figure 9:
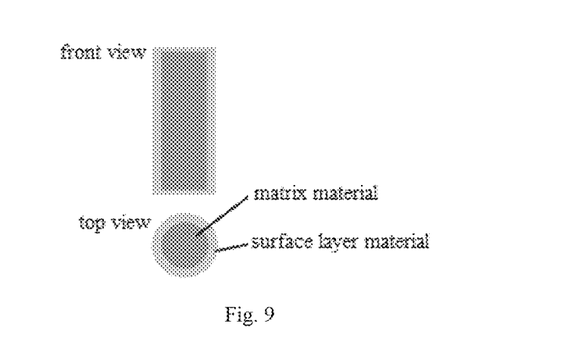
FIG. 9 is a complete-coated circular sectional structure model according to Example 10 of the present invention.

The preparation method of the prestressed ceramic comprises the following steps:
(1) making alumina into a non-compact cylinder with a diameter of 5 mm and a length of 50 mm and porosity of 80%;
(2) manufacture of a prestressed ceramic green body: firstly, setting a prestress value, and then calculating the sectional area ratio (a prestress-sectional area ratio curve is shown in FIG. 8) of the surface layer material to the matrix material through the sectional area ratio calculation formula to calculate the thickness of the surface layer material; then uniformly and completely coating the surface of the alumina cylinder by spraying the cordierite material (the coating schematic diagram is shown in FIG. 9, wherein the sectional area ratio of the cordierite material to the alumina cylinder is calculated from a top view); and
(3) high-temperature sintering: sintering the pre-stressed ceramic green body at 1500° C. for 3 h and then cooling to room temperature to form the pre-stressed ceramic.

The parameters are shown in Example 10 in Table 2; and the pre-stress and sectional area ratio curves of the pre-stressed ceramic prepared in this example is shown in FIG. 8. It can be seen from FIG. 8 that within a certain range, the prestress value increases, along with the increase of the ratio of the sectional area of the matrix to the sectional area of the surface layer, and does not increase any more when the ratio exceeds a certain range.

Under the same size, the bending strengths of the pre-stressed ceramic, matrix, and surface layer material prepared in this example tested by the three-point bending test method are 494.43 MPa, 435.0 MPa and 200.0 MPa, respectively. As a result, the bending strength of the prestressed ceramic prepared in this example is improved by 147.21% than that of the surface layer material and by 13.88% relative to that of the matrix.

EXAMPLE 11

Figure 10:
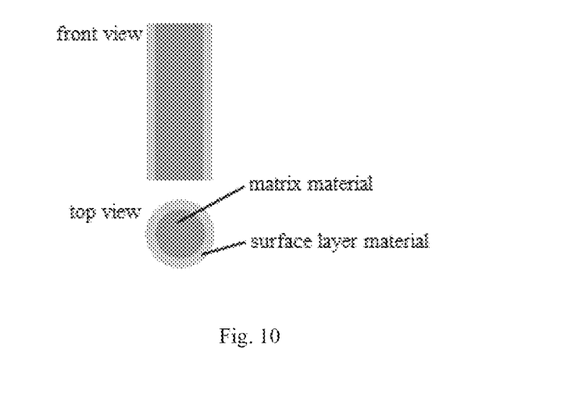
FIG. 10 is a partial-coated circular sectional structure model according to Example 11 of the present invention.

In this example; the parameters were set according to Example 11 in Table 2, in Which the cordierite material was partially and symmetrically coated on the surface of the alumina cylinder by a spray coating method (the coating schematic is shown in FIG. 10, in which the sectional area ratio of the two was calculated from the top view), and the remaining conditions were the same as in Example 10.

Under the same size, the bending strengths of the pre-stressed ceramic, matrix, and surface layer material prepared in this example tested by the three-point bending test method are 510.20 MPa, 435.0 MPa and 200.0 MPa, respectively. As a result, the bending strength of the pre-stressed ceramic prepared is improved by 155.10% than that of the surface layer material and by 17.29% relative to that of the matrix.

EXAMPLE 12

Figure 11:
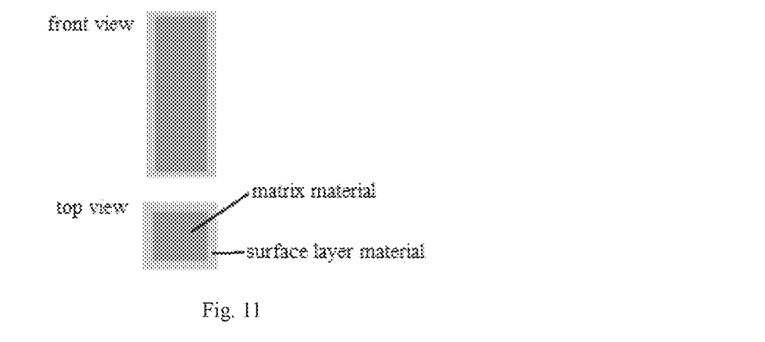
FIG. 11 is a complete-coated rectangular sectional structure model according to Example 12 of the present invention.

In this example, the parameters were set according to Example 12 of Table 2, in which the matrix material of this example is an alumina cubic cylinder having a width of 5 mm, a thickness of 5 mm and a length of 50 mm, and a cordierite material was uniformly and completely coated on the surface of the alumina cubic cylinder by a spray coating, method (the coating schematic is shown in FIG. 11, in which the sectional area ratio of the two was calculated from the top view), and the remaining conditions were the same as in Example 10.

Under the same size, the bending strengths of the pre-stressed ceramic, matrix, and surface layer material prepared in this example tested by the three-point bending test method are 544.78 MPa, 435.0 MPa and 200.0 MPa. As a result, the bending strength of the pre-stressed ceramic prepared is improved by 172.39% than that of the surface layer material and by 25.48% relative to that of the matrix.

EXAMPLE 13

Figure 12:
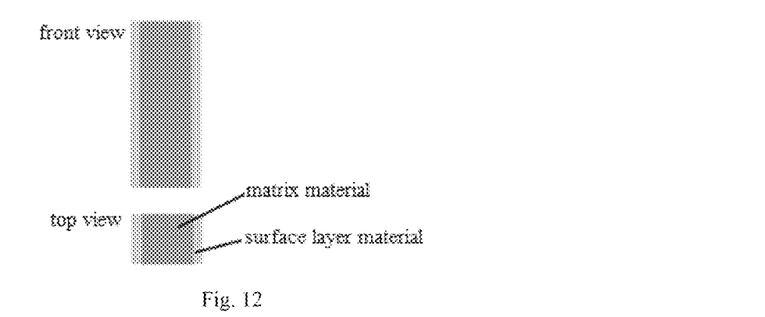
FIG. 12 is a partial-coated rectangular sectional structure model according to Example 13 of the present invention.

This example sets forth the parameters according to Example 13 of Table 2, in which the alumina matrix material of this example is a cubic cylinder having a width of 5 mm, a thickness of 5 mm, a length of 50 mm, and a porosity of 60%, and the cordierite material is coated on the surface of the cubic cylinder of alumina partially and symmetrically by a spray coating method (the coating schematic is shown in FIG. 12, in which the sectional area ratio of the two was calculated from the top view), and the remaining conditions were the same as in Example 10.

Under the same size, the bending strengths of the pre-stressed ceramic, matrix, and surface layer material prepared in this example tested by the three-point bending test method are 548.24 MPa, 435.0 MPa and 200.0 MPa. As a result, the bending strength of the pre-stressed ceramic prepared is improved by 174.12% than that of the surface layer material and by 26.28% relative to that of the matrix.

EXAMPLE 14

Figure 13:
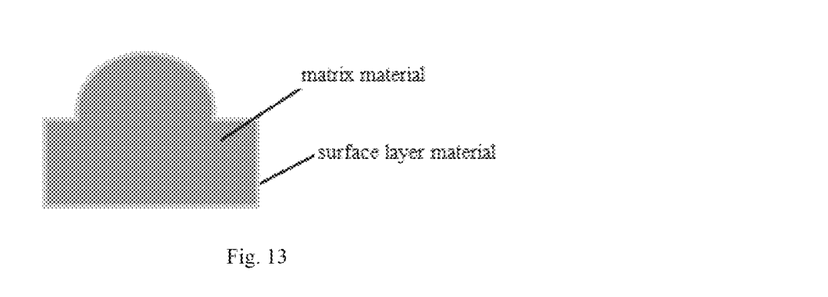
FIG. 13 is a complete-coated special-shaped sectional structure model according to Example 14 of the present invention.

In this example, the parameters were set according to Example 14 in Table 2, in which the alumina matrix material of this example is a special-shaped structure, and the cordierite material was uniformly and completely coated on the surface of the alumina special-shaped body by a spray coating method (the coating schematic diagram is shown in FIG. 13, and the sectional area ratio of the two was calculated based on the section view in the drawings), and the remaining conditions were the same as Example 1.

Under the same size, the bending strengths of the pre-stressed ceramic, matrix, and surface layer material prepared in this example tested by the three-point bending test method are 571.99 MPa, 435.0 MPa and 200.0 MPa. As a result, the bending strength of the pre-stressed ceramic prepared is improved by 185.99% than that of the surface layer material and by 31.49% relative to that of the matrix.

EXAMPLE 15

Figure 14:
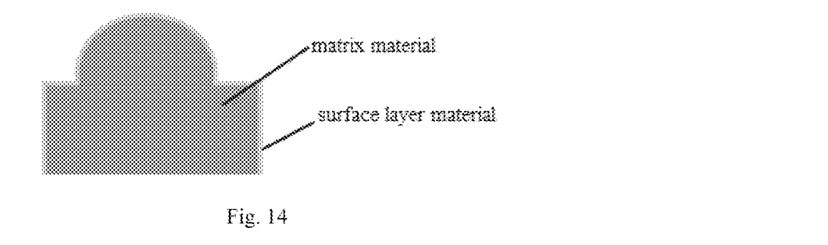
FIG. 14 is a partial-coated special-shaped sectional structure model according to Example 15 of the present invention.

In this example, the parameters were set according to Example 15 in Table 2, in which the alumina matrix material of this example is a special-shaped structure, and the cordierite material was partially and symmetrically coated on the surface of the alumina special-shaped body by a spray coating method (the coating schematic diagram is shown in FIG. 14, and the sectional area ratio of the two was calculated based on the section view in the drawings), and the remaining conditions were the same as in Example 10.

Under the same size, the bending strengths of the pre-stressed ceramic, matrix, and surface layer material prepared in this example tested by the three-point bending test method are 571.99 MPa, 435.0 MPa and 200.0 MPa. As a result, the bending strength of the pre-stressed ceramic prepared is improved by 185.99% than that of the surface layer material and by 31.49% relative to that of the matrix.

EXAMPLE 16

In this example, the parameters were set according to Example 16 in Table 2, and the remaining conditions were the same as Example 11.

Under the same size, the bending strengths of the pre-stressed ceramic, matrix, and surface layer material prepared in this example tested by the three-point bending test method are 592.80 MPa, 435.0 MPa and 200.0 MPa. As a result, the bending strength of the pre-stressed ceramic prepared is improved by 196.4% than that of the surface layer material and by 36.27% relative to that of the matrix.

EXAMPLE 17

In this example, the parameters were set according to Example 17 in Table 2, and the remaining conditions were the same as Example 11.

Under the same size, the bending strengths of the pre-stressed ceramic, matrix, and surface layer material prepared in this example tested by the three-point bending test method are 594.36 MPa, 435.0 MPa and 200.0 MPa. As a result, the bending strength of the pre-stressed ceramic prepared is improved by 197.18% than that of the surface layer material and by 36.63% relative to that of the matrix.

TABLE 2

| EXAMPLES | Matrix Materials | Surface Layer Material | Coating Mode | Sintering Temperature (° C.) | ΔT (° C.) | $\sigma_{pre}$ (MPa) | As/Ac | Bending Strength (MPa) |
|---|---|---|---|---|---|---|---|---|
| 1 | Alumina Cylinder | Cordierite | Complete | 1500 | 1480 | 1134.63 | 4.76 | 494.43 |
| 2 | Alumina Cylinder | Cordierite | Partial Symmetry | 1500 | 1480 | 1151.95 | 6.01 | 510.20 |
| 3 | Alumina Square Column | Cordierite | Complete | 1500 | 1480 | 1169.48 | 8.09 | 544.78 |
| 4 | Alumina Square Column | Cordierite | Partial Symmetry | 1500 | 1480 | 1187.25 | 12.25 | 582.24 |
| 5 | Alumina Special-shape | Cordierite | Complete | 1500 | 1480 | 1205.12 | 24.75 | 571.99 |
| 6 | Alumina Special-shape | Cordierite | Partial Symmetry | 1500 | 1480 | 1214.15 | 49.75 | 571.99 |
| 7 | Alumina Cylinder | Cordierite | Partial Symmetry | 1350 | 1330 | 1082.98 | 24.75 | 592.80 |
| 8 | Alumina Cylinder | Cordierite | Partial Symmetry | 1650 | 1630 | 1327.26 | 24.75 | 594.36 |

In summary, more than two combinable materials are respectively formed into a matrix material and a surface layer material, and the prestressed ceramic is formed through high-temperature sintering. Wherein, the matrix material should have sufficient strength and a higher expansion coefficient, and the surface layer material should have a lower expansion coefficient and a higher elastic modulus; realizing the balance of the surface layer compressive stress and the matrix tensile stress are formed after high-temperature sintering; and the surface layer compressive stress can greatly improve the bending strength of the prestressed ceramic. The magnitude of the compressive stress can be adjusted by optimizing the section ratio of the two materials of the cross section, the surface prestress is designed to be more than the strength value of the surface layer material for the given two materials, the section ratio is determined through deduction and calculation of a prestress calculation formula; the prestressed ceramic with prestress can be obtained after sintering, and the strength of the prestressed ceramic can be greatly improved. Therefore, the present invention solves the problem that the strength of the current structural ceramic is difficult to improve, and has good practical value.

Therefore, the bending strength of the high-strength prestressed composite ceramic prepared by the method can be greatly improved, can be improved by up to 238% relative to the surface layer material, and by up to 57.5% relative to the matrix material; moreover, the preparation process is simple, most existing ceramic forming processes and sintering processes can be adopted for compounding the substrate layer and the surface layer, and the method is suitable for industrial mass production.

The experiments are only preferred examples of the present invention and are not intended to limit the scope of the present invention. It should be noted that numerous modifications and adaptations may be made by those skilled in the art without departing from the principles of the present invention, and such modifications and adaptations are to be considered within the scope of the present invention.

We claim:

1. A high-strength prestressed composite ceramic, characterized in that, the prestressed ceramic comprises a multilayer structure formed by a matrix and a surface layer; an expansion coefficient of a surface layer material constituting the surface layer is lower than that of a matrix material constituting the matrix; an elastic modulus of the surface layer material is not lower than that of the matrix material; and the matrix is coated with the surface layer; a sectional area ratio of the matrix to the surface layer is 0.1-2500; the surface layer material and the matrix material are different and independently selected from alumina, cordierite, mullite, and magnesia alumina spinel.

2. The high-strength prestressed composite ceramic of claim 1, characterized in that, the surface layer is a single-component monolayer or a multi-component multilayer.

3. The high-strength prestressed composite ceramic of claim 1, characterized in that, the surface layer material is cordierite and the matrix material is alumina.

4. The high strength prestressed composite ceramic of claim 1, characterized in that, the surface layer material is completely or partially coated on the matrix material.

5. The high strength prestressed composite ceramic of claim 4, characterized in that, the partial coating is a symmetric coating.

6. The high-strength prestressed composite ceramic of claim 1, characterized in that, the high-strength prestressed ceramic is formed by co-sintering the matrix material and the surface layer material at a high temperature.

7. The high strength prestressed composite ceramic of claim 1, characterized in that, the high-strength prestressed composite ceramic is prepared by the following steps:
    (1) preparing a matrix material and a surface layer material;
    (2) preparing a composite ceramic green body: uniformly coating the surface layer material on a surface of the matrix material in a particle accumulation mode; and
    (3) high-temperature co-sintering: sintering the composite ceramic green body at a high temperature to finish the high-temperature co-sintering of the surface layer material and the matrix material, and then synchronously cooling down to form the high-strength prestressed composite ceramic.

8. The high strength prestressed composite ceramic of claim 7, characterized in that, in the step (1), the matrix material is prepared by making the matrix material into a predetermined shape to form the matrix; in the step (2), the surface layer material is completely coated or partially coated on the matrix material; the partial coating is a symmetric coating.

9. The high strength prestressed composite ceramic of claim 7, characterized in that, the composite ceramic green body is sintered at a high temperature of 800-1800° C. to complete the high-temperature co-sintering of the surface layer material and the matrix material, followed by synchronously cooling to room temperature to form the high-strength prestressed composite ceramic; an expansion coefficient of the surface layer material is lower than that of the matrix material, and an elastic modulus of the surface layer material is not lower than that of the matrix material.

10. The high strength prestressed composite ceramic of claim 7, characterized in that, the surface layer material and the matrix material are different and independently selected from alumina, cordierite, mullite, and magnesia alumina spinel.

* * * * *